J. A. MANAHAN.
WATER STILL.
APPLICATION FILED APR. 5, 1913.
1,145,497. Patented July 6, 1915.
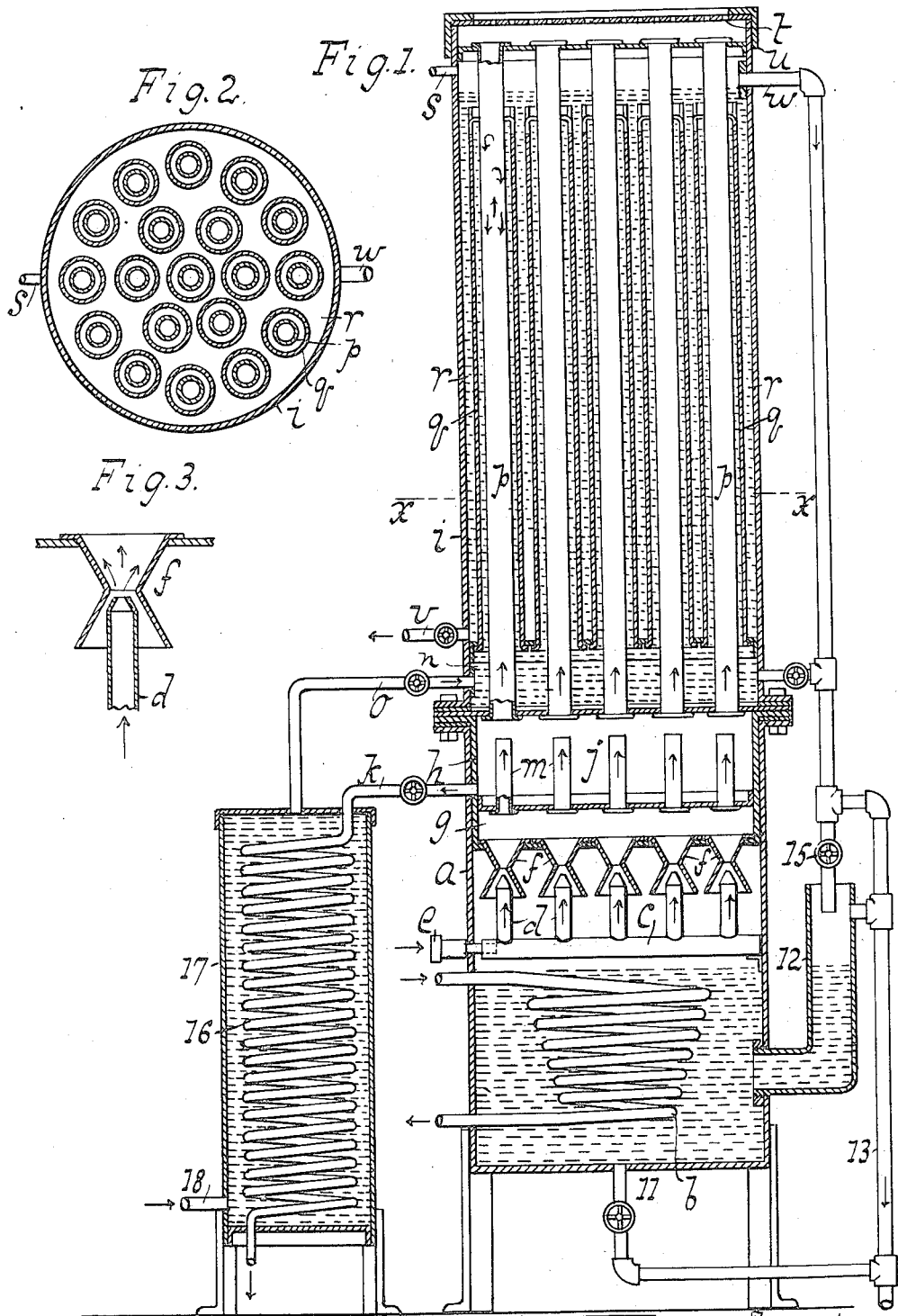
Witnesses:
William Miller
Chris H. Almstaedt
Inventor
Joseph A. Manahan
By his Attorneys
Hauff & Warland.

UNITED STATES PATENT OFFICE.

JOSEPH A. MANAHAN, OF NEW YORK, N. Y., ASSIGNOR TO THOMAS MANAHAN, OF NEW YORK, N. Y.

WATER-STILL.

1,145,497. Specification of Letters Patent. Patented July 6, 1915.

Application filed April 5, 1913. Serial No. 759,041.

*To all whom it may concern:*

Be it known that I, JOSEPH A. MANAHAN, a citizen of the United States, residing at New York, county of New York, State of New York, have invented new and useful Improvements in Water-Stills, of which the following is a specification.

This invention relates to a still which is essentially adapted for purifying water by condensation and aeration.

The object of the invention is to produce a still whereby continuous operation is insured and the water is thoroughly purified.

The still is designed to evaporate and to condense the raw or impure water and it includes means for mixing a quantity of filtered air with the water. It also includes means for cooling the aerated water after it flows from the main still.

The apparatus consists of an evaporator having a tapered steam coil, funnel shaped vapor outlets to cause a partial vacuum for intake of air, a vapor mixing chamber, a distilled water reservoir, and a condenser located above the vapor outlets.

The invention is more fully described in the following specification and claims and illustrated in the accompanying drawing in which—

Figure 1 represents a vertical section of a still embodying this invention. Fig. 2 is a horizontal section taken along the line $x\ x$ of the same. Fig. 3 is a detail section of a vapor funnel.

In this drawing the letter $a$ designates a shell which incloses an evaporator having a steam coil $b$ with inlet and outlet tubes connected to a boiler to furnish steam for the coil and heat the water in the evaporating chamber. The steam coil as shown is tapered to prevent air blanketing in evaporation of surrounding water. In the upper portion of the evaporator chamber is located an air inlet tube $c$ provided with one or any number of upwardly projecting tubes $d$ having contracted nozzles. The air inlet tube has a filter $e$ fixed to the end of the inlet to eliminate any impurities in the air. One or a series of funnel shaped vapor inlets $f$ communicate with the upper portion of the evaporator chamber. Each of the said air tubes $d$ projects into the lower portion of the funnel shaped inlets $f$ and the nozzle portion of the air tube being approximately in line with the narrow portion of the funnel will cause a partial vacuum for intake of air by reducing its volume thus giving thorough mixture of air and vapor. The inlets $f$ lead into an air mixing chamber $g$ situated above the evaporator chamber. The mixing chamber forms part of a receptacle $h$ which is bolted to the said lower shell $a$ and to an upper shell $i$. This receptacle is divided by a partition to form an aerated water chamber $j$. An outlet tube $k$ serves to draw off the aerated water from the said chamber. Tubes $m$ lead from the air and vapor mixing chamber $g$ into the aerated water chamber.

A raw or impure water chamber $n$ is located above the aerated water chamber $j$ and an inlet tube $o$ connected to a main supply leads into the chamber. To the lower portion of the raw water inlet chamber is fixed one or a series of condenser tubes $p$ communicating with the aerated water chamber and having open lower and upper ends. Each of the condenser tubes is encircled by a tube $q$ connected to the upper portions of the water chamber $n$ and extending to nearly the top of the condensing tube. This tube $q$ serves to circulate the cold water entering the inlet $o$ around the condensing tube. The condensed water escapes from the upper end of the tube $q$ into a reservoir chamber $r$ inclosed by the said upper shell $i$. This chamber has a vent $s$ extending from the upper portion of the shell to provide means for the escape of gases or impurities contained in the distilled water. The upper portion of the shell $i$ has a cover of fine mesh $t$ held in place by means of a collar $u$ attached to the shell. This reticulated material allows the gases to escape from the open ends of the condenser tubes. A tube $v$ communicates with the lower portion of the reservoir and when the valve on the tube is opened it serves to blow off any sediment lodged in the bottom of the reservoir. An outlet tube $w$ located at the top of the reservoir extends downwardly to a pipe 12 leading into the evaporator chamber. An overflow pipe 13 is connected to the upper portion of the pipe 12 to draw off the surplus condensing water. A valve 15 gages the amount of water delivered to the evaporator.

The aerated water can be run through a coil 16 located in a shell 17. In this construction the cold raw water enters the shell at 18 and passes around the coil to the tube *o* and thence into the raw water chamber. To the lower portion of the evaporator chamber is connected a tube 11 which serves as a vent to a sewer or hot well.

When the still is in operation raw water under pressure is admitted into the shell 17 to pipe *o* into chamber *n* and thence around the condenser tube *p* where it is vaporized and collected into the reservoir *r* where it is condensed and passes through the pipe *w* to the evaporator chamber. The vapor from the evaporator chamber descends to the funnel shaped tubes *f* where it commingles with the air from the tubes *d*, thence it flows into the air mixing chamber *g* and by means of the short pipe *m* circulates into the condenser tube and is vaporized to flow into the chamber *j* where it can be drawn off in a pure state.

By having the coil *b* tapered it transmits all its heat units directly to the surrounding water in the evaporation chamber.

It will be seen that the still is continuous while in operation, the impure water being fed continuously into the still while the pure aerated water is drawn off for use.

It should be said that by having the vapor tubes *f* with contracted central portions and a wide mouth the air and vapor are somewhat deflected causing a partial vacuum at this point, circulating the volume of vapor and thus completely mixing the two gases before they ascend into the condenser.

I claim:—

1. A water still comprising a shell, an evaporator chamber located in the shell, an air mixing chamber arranged above the evaporator chamber, a series of vapor outlets having enlarged inlet and discharge ends and contracted centers communicating with both chambers, an air inlet tube extending into each of the vapor outlets nearly to the contracted centers thereof, and a condenser situated above the vapor outlet.

2. A water still comprising a shell, an evaporator chamber located in the shell, an air mixing chamber arranged above the evaporator chamber, a steam coil disposed in the evaporator chamber, vapor outlets having enlarged inlet and discharge ends and contracted centers leading from the evaporator chamber and communicating with the air mixing chamber, an air inlet tube projecting into each of the vapor outlets nearly to the contracted centers thereof, a condenser situated above the vapor outlets, an aerated water chamber arranged below the condenser, a raw water chamber located between the condenser and the aerated water chamber, means including a shell connected with the raw water chamber, and a coil within the shell connected to the aerated water chamber for drawing off and cooling the water.

JOSEPH A. MANAHAN.

Witnesses:
WM. E. WARLAND,
CHRIS. W. ALLSTAEDT.